M. P. STEVENS.
GAS BURNER VALVE.
APPLICATION FILED MAY 22, 1913.
1,095,295.
Patented May 5, 1914.
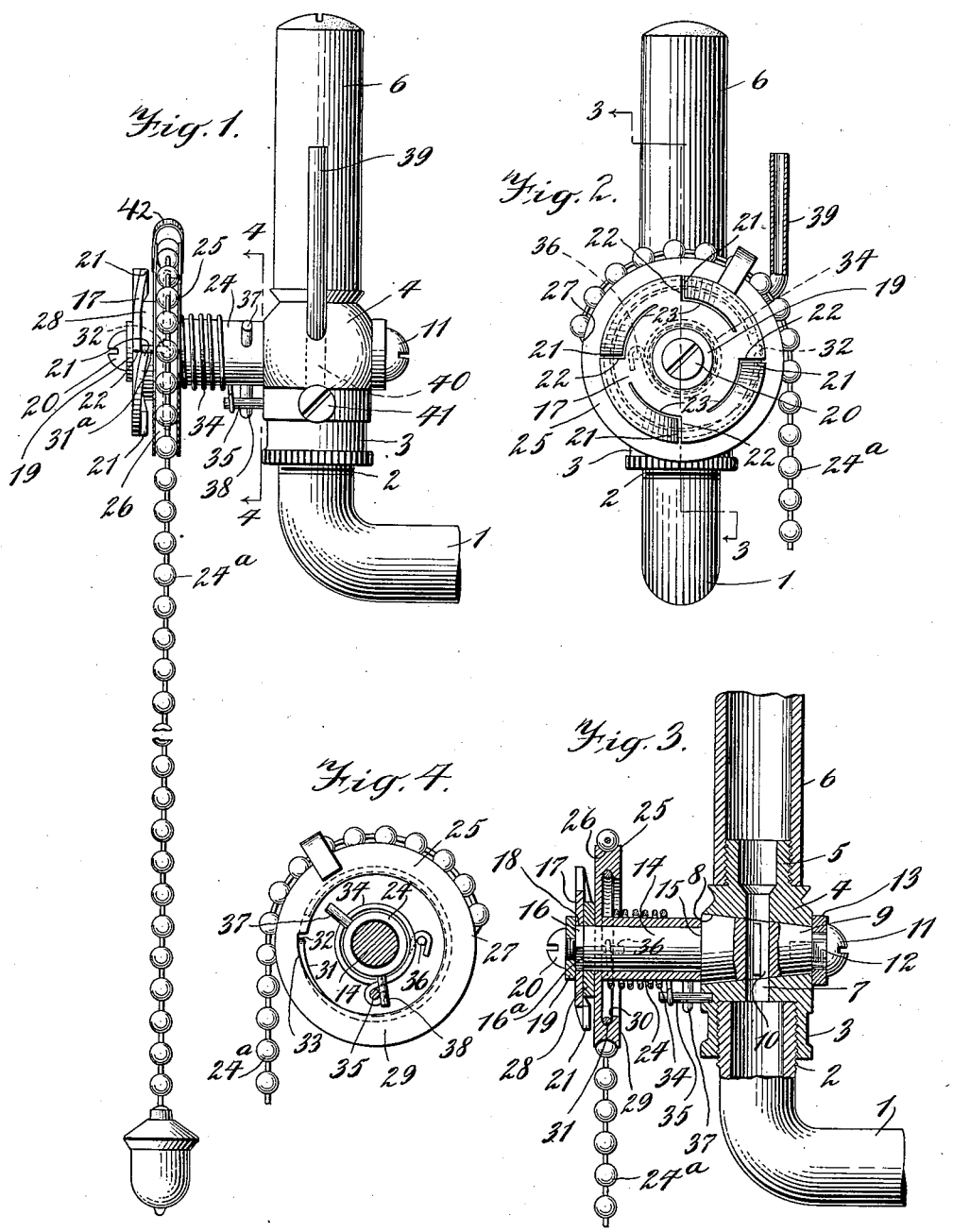
Witnesses:
Merton P. Stevens   Inventor
By his Attorneys

UNITED STATES PATENT OFFICE.

MERTON P. STEVENS, OF EAST ORANGE, NEW JERSEY.

GAS-BURNER VALVE.

1,095,295.  Specification of Letters Patent.  Patented May 5, 1914.

Application filed May 22, 1913. Serial No. 769,173.

*To all whom it may concern:*

Be it known that I, MERTON P. STEVENS, a citizen of the United States, residing at East Orange, in the county of Essex and State of New Jersey, have invented certain new and useful Improvements in Gas-Burner Valves, of which the following is a specification.

My invention relates to new and useful improvements in valves for controlling the flow of illuminating gas from a supply pipe to a gas burner, and more particularly contemplates a valve for use in connection with burners adapted to be ignited by a pilot flame, the valve being so constructed as to be operated by a pull-device to alternately admit gas to, and cut it off from, the burner, so that a pull on said device alternately operates to light and extinguish the flame.

The invention consists in the improvements to be more fully described hereinafter and the novelty of which will be particularly pointed out and distinctly claimed.

I have fully and clearly illustrated my invention in the accompanying drawings to be taken as a part of this specification and wherein:

Figure 1 is a view in elevation of a structure exemplifying my invention. Fig. 2 is a view in elevation looking from the left of Fig. 1, and partly in section. Fig. 3 is a section on the line 3—3 of Fig. 2. Fig. 4 is a section on the line 4—4 of Fig. 1.

Referring to the drawings by characters of reference: 1 designates a supply-pipe which may be connected to any suitable source of gas supply, and having a threaded end 2, screwed into an interiorly threaded socket 3, at one end of a valve-casing 4, the opposite end of which is provided with a threaded nipple 5 screwed into a burner tube 6. The valve-casing 4 is formed with a longitudinal passage 7 through which the gas flows from the supply-pipe 1 to the burner 6, and intersecting said passage 7 is a conical valve-seat 8, in which is rotatably seated a turn-plug 9 having a diametrically arranged port 10 adapted, upon rotation of the plug 9, to aline with the passage 7 to permit flow of gas through said passage, as shown in Fig. 3. The port 10 is so arranged that when the plug is turned a quarter of a turn from the position shown in Fig. 3, said port will be moved out of alinement with said passage 7 so that the supply of gas to the burner will be cut off, and on the next quarter turn will aline with the said passage to establish flow therethrough. The valve-plug 9 is urged to its seat by an adjusting screw 11 threaded into lug 12 of the valve-plug, said lug having an angular peripheral contour and mounted on said lug is a washer 13 located between the casing 4 and the screw 11, the opening in said washer conforming to the contour of the said lug. At the end opposite to that carrying the screw 11 the valve-plug is provided with a longitudinally extending stem or spindle 14, and a shoulder 15, the outer end of said stem 14 being squared, as at 16, to receive a ratchet disk 17 having a squared central opening 18 to receive said squared portion 16, so that said disk is rigidly connected to the spindle to cause the disk and spindle to rotate together. The ratchet disk 17 is held in place against a shoulder 16$^a$ at the base of the portion 16, and from dislodgment from said portion by a washer 19 secured to the end of the spindle 14 by a clamping screw 20 threaded into the end of said spindle. This ratchet disk is preferably stamped from sheet metal with four ratchets 21 spaced equal distances apart circumferentially of the disk, and formed by cutting radial slots 22 extending inward from the periphery of the disk for a short distance and then slotting the disk with slots 23 extending respectively from the inner ends of slots 22. The slots 23 run parallel to the circumference of the disk and the free ends of the circumferential arms thus formed are deflected inward, toward the valve and in a direction lengthwise of the valve spindle, to form the ratchets 21. These ratchets 21 may be resilient or yielding, the disk being preferably of a suitable spring metal. Mounted on the spindle 14 to rotate about the same is a sleeve 24, one end of which abuts the said shoulder 15 at the base of the spindle 14, and the opposite end of which carries an operating member in the form of a wheel 25 having a circumferential groove 26 to receive a pull-chain 24$^a$ having one end fastened to said wheel, as at 27, in any suitable manner and by means of which said wheel is rotated in one direction. This wheel and the sleeve upon which it is mounted, are immovable lengthwise of the shaft, such movement being prevented by said shoulder 15 and the ratchet disk, a spacing washer 28 being arranged between the wheel and the ratchet disk.

The wheel 25 is provided with a flange 29 on the face away from the ratchet disk, said flange having an internal undercut circular groove 30 parallel with the circumference of the wheel and in which is seated a coil of spring wire 31, the ends of which are preferably spaced as shown. One end of this coil 31 is bent laterally as at 31ª and projected through an opening 32 in the wheel 25, said end normally extending beyond the outer face of the wheel into position to coöperate, as a pawl, with the ratchets 21 of the ratchet disk. The flange 29 is preferably cut away adjacent said bent end of the spring 31, as shown at 33, so that the pawl constituting part of the said spring may move back when the free end of said part rides up the adjacent inclined faces of the ratchets 21.

Coiled around the sleeve 24 is a spring 34, one end of which is connected to a post 35, on the valve-casing, while the other end is secured to a post 36 on the wheel 25, the function of this spring being to rotate the wheel to normal position after it has been operated by the pull chain 24ª.

The rotation of the sleeve 24 and the wheel 25 is limited in one direction, when pulled by the chain 24ª, by a stop pin 37, projecting radially from said sleeve, arranged to strike the post 35, and in the opposite direction, when returned to normal position, by a stop 38 on said sleeve contacting the said post.

39 designates a pilot burner tube carried by the valve-casing 4 and communicating with a by-pass duct 40 therein, shown in dotted lines in Fig. 1, leading around the valve 9 and controlled by a regulating valve screw 41.

The construction of the valve being preferably as above described, the operation thereof is as follows, the parts being normally in the position shown in the several figures of the drawings, and it being understood that a flame is burning at the pilot burner 39: The operator grasps the chain 24 and, upon pulling the same, will rotate the operating wheel 25 clockwise of Fig. 2, the projecting end 32 of the spring pawl engaging the adjacent ratchet tooth 21, as shown in Fig. 1 in full lines and dotted lines in Fig. 2, to turn the ratchet disk and the valve plug a quarter of a revolution until the stop 37 strikes the post 35. It will be understood that the stops 37 and 38 are arranged apart such a distance that a pull on the chain will enable the wheel to turn the ratchet disk and the valve plug one quarter of a revolution. Assuming that the valve is closed; that is, that the opening 10 extending diametrically of the plug is transverse of the opening through the valve-casing, a pull on the chain will turn the valve one quarter of a revolution, causing the opening through the plug to aline with the opening through the valve-casing, thereby permitting a flow of gas to the burner and the ignition of the gas by the flame of the pilot burner. Upon releasing the chain the spring 34 will rotate the chain wheel to its initial, or normal, position, its movement in this direction being stopped by engagement of the pin 38 with the post 35. During the return movement of the chain wheel to initial position the pawl part 31ª rides over the inclined surface of one of the ratchet teeth and yields, under pressure thereagainst until the chain wheel reaches its initial position, whereupon the part 31ª slips over the end of the tooth 21 and is in position to engage the same to rotate the valve stem when the chain wheel is again operated. When the valve is to be closed, the chain is pulled, operating the chain wheel and associated parts in the manner heretofore described, but turning the valve plug one quarter of a revolution so as to bring the opening through the turn plug transversely of the opening through the valve casing and bring the closed wall of the plug across said opening in the valve casing.

During the return movement of the chain wheel both the pawl part 31ª and the adjacent ratchet tooth or member 21 preferably yield so that frictional contact between the two parts is reduced to a minimum and the chain wheel returns freely to its initial position without rotating the valve stem.

The chain wheel may be provided with a guard 42, consisting of a band arched over the groove 26 in the wheel to maintain the pull-chain in said groove.

What I claim and desire to secure by Letters Patent of the United States is:—

1. In a gas burner valve, in combination, a valve casing, a turn plug having an extended spindle, a ratchet disk fixed on the spindle, and an operating member rotatable on the spindle but immovable lengthwise thereof, and a spring coil carried by said member and having a projection yieldingly coöperable with said ratchet disk.

2. In a gas burner valve, in combination, a valve casing, a turn plug having an extended spindle, a ratchet disk fast on the outer end of the spindle and having laterally extending teeth, a chain wheel rotatable with the spindle and immovable lengthwise thereof, and a spring coil carried by said wheel and projected laterally therefrom to coöperate with said teeth.

3. In a gas burner valve, in combination, a valve-casing, a turn plug having an extended spindle, a ratchet disk fast on the spindle, a chain wheel rotatable on the spindle, a spring coil carried by said wheel and having a projection yieldingly coöperable with said ratchet disk.

4. In a gas burner valve, in combination, a valve-casing, a turn plug having an extended spindle, a ratchet disk fast on the spindle, a chain wheel rotatable on the spindle, and having a circumferential flange, a spring wire coil housed within said flange and having a part directed through and movable in an opening in the wheel and projected into engagement with said ratchet disk.

5. In a gas burner valve, in combination, a valve-casing, a turn plug having an extended spindle, a ratchet disk fast on the spindle, a chain wheel rotatable on the spindle, and having a circumferential flange having an undercut groove, a spring wire coil housed within said groove and having a part directed through and movable in an opening in the wheel and projecting into engagement with the ratchet disk.

6. In a gas burner valve, in combination, a valve-casing, a turn plug having an extended spindle, a ratchet disk fast on the spindle, a chain wheel rotatable on the spindle, and having a circumferential flange having an undercut groove, a spring wire coil housed within said groove and having a part directed through and movable in an opening in the wheel and projecting into engagement with the ratchet disk, said flange having a recess permitting yielding movement of the said part.

7. In a gas burner valve, in combination, a valve-casing, a turn plug having an extended spindle, a ratchet disk fast on the spindle, and having laterally projecting spring ratchet members, a chain wheel rotatable on the spindle and held against movement lengthwise of the spindle, said chain wheel being provided with a yielding pawl device projecting laterally thereform to coöperate with said spring ratchet members.

8. In a gas burner valve, in combination, a valve-casing, a turn plug having an extended spindle and a shoulder, a ratchet disk fast on the spindle, a sleeve on the spindle and held against longitudinal movement by said disk and said shoulder, a chain wheel fixed to the sleeve and a pawl on the chain wheel coöperable with said ratchet disk.

9. In a gas burner valve, in combination, a valve-casing, a turn plug having an extended spindle, and a shoulder, a ratchet disk fast on the spindle, a sleeve on the spindle and held against movement lengthwise thereof by said ratchet disk and shoulder, a chain wheel on said sleeve and a spring pawl on the chain wheel coöperable with the ratchet disk.

10. In a gas burner valve, in combination, a valve-casing, a turn plug having an extended spindle and a shoulder, a ratchet disk fast on the spindle, a sleeve on the spindle and held against longitudinal movement by said disk and said shoulder, a chain wheel fixed to the sleeve and having a pawl coöperable with said ratchet disk, a chain for rotating said chain wheel in one direction, and means for moving said chain wheel in the other direction.

11. In a gas burner valve, in combination, a valve-casing, a turn plug having an extended spindle and a shoulder, a ratchet disk fast on the spindle, a sleeve on the spindle and held against longitudinal movement by said disk and said shoulder, a chain wheel fixed to the sleeve and having a pawl coöperable with said ratchet disk, a chain for rotating said chain wheel in one direction, and a spring for moving the chain wheel in the other direction.

12. In a gas burner valve, in combination, a valve-casing, a turn plug having an extended spindle and a shoulder, a ratchet disk fast on the spindle, a sleeve on the spindle and held against longitudinal movement by said disk and said shoulder, a chain wheel fixed to the sleeve and having a pawl coöperable with said ratchet disk, a chain for rotating said chain wheel in one direction, a spring for moving the chain wheel in the other direction, and stops for limiting movement of the chain wheel by said chain and spring.

13. In a gas burner valve, in combination, a valve casing, a turn plug, a spindle, a ratchet disk member on the spindle, an operating member rotatable on the spindle, one of said members having a flange having an undercut groove, a spring wire coil housed within said groove and having a part movable through an opening in the flanged member and projecting into engagement with the other member, means for moving said operating member in one direction to rotate said spindle, and means for rotating said member in the opposite direction.

In testimony whereof I have hereunto signed my name in the presence of two subscribing witnesses.

MERTON P. STEVENS.

Witnesses:
M. E. McNINCH,
C. G. HEYLMUN.